(12) United States Patent
Hoath et al.

(10) Patent No.: US 7,811,123 B2
(45) Date of Patent: Oct. 12, 2010

(54) UPGRADEABLE TELECOMMUNICATIONS PATCH PANEL AND METHOD OF UPGRADING SAME

(75) Inventors: Alastair Hoath, Cheltenham (GB); Stephen John Hough, Tewkesbury (GB); Stephen James Morris, Cheltenham (GB); Gordon John White, Gloucester (GB)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/655,893

(22) Filed: Jan. 8, 2010

(65) Prior Publication Data

US 2010/0184324 A1 Jul. 22, 2010

Related U.S. Application Data

(63) Continuation of application No. 12/355,268, filed on Jan. 16, 2009, now Pat. No. 7,641,513, which is a continuation of application No. 11/973,337, filed on Oct. 5, 2007, now Pat. No. 7,479,032.

(60) Provisional application No. 60/851,002, filed on Oct. 10, 2006, provisional application No. 60/856,384, filed on Nov. 1, 2006.

(51) Int. Cl.
*H01R 13/66* (2006.01)
(52) U.S. Cl. .................... 439/540.1; 439/490
(58) Field of Classification Search ............... 439/540.1, 439/490
See application file for complete search history.

(56) References Cited

U.S. PATENT DOCUMENTS

| | | | |
|---|---|---|---|
| 4,840,568 A | 6/1989 | Burroughs et al. | |
| 5,161,988 A | 11/1992 | Krupka | |
| 5,199,878 A | 4/1993 | Dewey et al. | |
| 5,305,405 A | 4/1994 | Emmons et al. | |
| 5,393,249 A | 2/1995 | Morgenstern et al. | |
| 5,394,503 A | 2/1995 | Dietz, Jr. et al. | |
| 5,418,334 A | 5/1995 | Williams | |
| 5,467,062 A | 11/1995 | Burroughs | |
| 5,473,715 A | 12/1995 | Schofield et al. | |

(Continued)

FOREIGN PATENT DOCUMENTS

DE 10 2004 033 940 A1 2/2006

(Continued)

OTHER PUBLICATIONS

ADC Krone Technical Data; TrueNet®, CopperTen™ Unshielded 24 Port Patch Panel and Accessories; 6 pgs.; dated Dec. 5, 2005.

(Continued)

*Primary Examiner*—Hae Moon Hyeon
(74) *Attorney, Agent, or Firm*—Merchant & Gould P.C.

(57) ABSTRACT

An upgradeable patch panel assembly and associated method of upgrading a patch panel assembly. The upgradeable patch panel assembly including a panel base having an aperture sized to receive a scanner interface cable. The method including removing a first cover from the panel base, inserting a scanner interface cable through the existing aperture in the panel base, and attached an upgraded cover to the panel base. Upgrading the patch panel assembly is completed while the assembly remains mounted to a frame and without disconnecting rear cable connections. The upgraded patch panel assembly provides jack-occupancy monitoring capabilities.

11 Claims, 18 Drawing Sheets

U.S. PATENT DOCUMENTS

| | | | |
|---|---|---|---|
| 5,483,467 A | 1/1996 | Krupka et al. |
| 5,494,461 A | 2/1996 | Bippus et al. |
| 5,685,741 A | 11/1997 | Dewey et al. |
| 5,854,824 A | 12/1998 | Bengal et al. |
| 6,222,908 B1 | 4/2001 | Bartolutti et al. |
| 6,234,830 B1 | 5/2001 | Ensz et al. |
| 6,285,293 B1 | 9/2001 | German et al. |
| 6,300,877 B1 | 10/2001 | Schannach et al. |
| 6,330,307 B1 | 12/2001 | Bloch et al. |
| 6,350,148 B1 | 2/2002 | Bartolutti et al. |
| 6,424,710 B1 | 7/2002 | Bartolutti et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,574,586 B1 | 6/2003 | David et al. |
| 6,636,152 B2 | 10/2003 | Schannach et al. |
| 6,743,044 B2 | 6/2004 | Musolf et al. |
| 6,784,802 B1 | 8/2004 | Stanescu |
| D510,068 S | 9/2005 | Haggay et al. |
| 6,961,675 B2 | 11/2005 | David |
| 6,976,867 B2 | 12/2005 | Navarro et al. |
| 7,038,918 B2 | 5/2006 | AbuGhazaleh et al. |
| 7,066,770 B2 | 6/2006 | Pepe |
| 7,153,142 B2 | 12/2006 | Shifris et al. |
| 7,226,217 B1 | 6/2007 | Benton et al. |
| 7,234,944 B2 | 6/2007 | Nordin et al. |
| 7,243,837 B2 | 7/2007 | Durrant et al. |
| 7,297,018 B2 | 11/2007 | Caveney et al. |
| 7,312,715 B2 | 12/2007 | Shalts et al. |
| 7,458,517 B2 | 12/2008 | Durrant et al. |
| 7,479,032 B2 | 1/2009 | Hoath et al. |
| 7,488,206 B2 * | 2/2009 | Caveney et al. | 439/540.1 |
| 7,641,513 B2 | 1/2010 | Hoath et al. |
| 7,686,643 B2 * | 3/2010 | Pepe et al. | 439/490 |
| 2005/0186819 A1 | 8/2005 | Velleca et al. |
| 2006/0160395 A1 | 7/2006 | Macauley et al. |
| 2006/0160396 A1 | 7/2006 | Macauley et al. |
| 2006/0271338 A1 | 11/2006 | Haggay et al. |
| 2007/0049127 A1 | 3/2007 | Nordin et al. |
| 2007/0117444 A1 | 5/2007 | Caveney et al. |
| 2007/0230452 A1 | 10/2007 | Hough et al. |
| 2007/0238343 A1 | 10/2007 | Velleca et al. |
| 2008/0106871 A1 | 5/2008 | James |
| 2009/0053923 A1 | 2/2009 | Navarro et al. |

FOREIGN PATENT DOCUMENTS

| | | |
|---|---|---|
| EP | 1 465 438 A1 | 10/2004 |
| EP | 1 478 056 A1 | 11/2004 |
| GB | 2 344 702 A | 6/2000 |
| GB | 2 347 508 A | 9/2000 |
| GB | 2 347 751 A | 9/2000 |
| WO | WO 2006/048222 A1 | 5/2006 |

OTHER PUBLICATIONS

Clark et al.; U.S. Appl. No. 11/583,995; *Rotatable Connector Modules with Inverted Jacks*, filed Oct. 19, 2006.

International Search Report and Written Opinion mailed Mar. 12, 2008.

"The intelligent way to make Moves, Adds and Changes!," *Nordx/CDT*, 6 pages (2003).

Meredith, L., "Managers missing point of intelligent patching," *Data Center News*, http://searchdatacenter.techtarget.com/news/article/0,289142,sid80_gcil099991,00.html, pp. 1-2 (Jun. 21, 2005).

Milligan, B., "Intelligent patching systems carving out a 'large' niche," Cabling Installation & Maintenance, http://cim.pennnet.com/display_article/207641/27/ARTCL/none/none/1/Intelligent-patchin..., pp. 1-6 (Jul. 2004).

Press Releases, "Avaya's Enhanced SYSTIMAX® iPatch System Enables IT Managers to Optimize Network Efficiency and Cut Downtime," *Avaya Inc.*, http://www.avaya.com/gcm/master-usa/en-us/corporate/pressroom/pressreleases/2003/pr-..., pp. 1-2 (May 9, 2003).

Press Releases, "Avaya's Enhanced SYSTIMAX® iPatch System Enables IT Managers to Optimise Network Efficiency and Cut Downtime," *Avaya Inc.*, http://www.avaya.com/gcm/master-usa/en-us/corporate/pressroom/pressreleases/2003/pr-..., pp. 1-2 (May 20, 2003).

Press Releases, "SYSTIMAX® iPatch System Wins Platinum Network of the Year Award," *Avaya Inc.*, http://www.avaya.com/gcm/master-usa/en-us/corporate/pressroom/pressreleases/2003/pr-..., pp. 1-2 (Jan. 30, 2003).

"Spec Sheet—TrueNet® CopperTen Modules," *ADC Krone*, Issue 2, 2 pages (Copyright 2006).

RiT Connect & Control, ILPMS Components, pp. 1-83 (Aug. 2005).

* cited by examiner

Detail C

Detail A

Detail D

Detail B

UPGRADEABLE TELECOMMUNICATIONS PATCH PANEL AND METHOD OF UPGRADING SAME

CROSS-REFERENCE TO RELATED APPLICATIONS

This application is a continuation of application Ser. No. 12/355,268, filed Jan. 16, 2009 now U.S. Pat. No. 7,641,513, which is a continuation of application Ser. No. 11/973,337, filed Oct. 5, 2007, now U.S. Pat. No. 7,479,032, which claims the benefit of U.S. provisional application Ser. No. 60/851,002, filed Oct. 10, 2006, and U.S. provisional application Ser. No. 60/856,384, filed Nov. 1, 2006, which applications are incorporated herein by reference.

FIELD OF THE INVENTION

This disclosure relates to methods and devices for use in the telecommunications industry. More specifically, this disclosure relates to methods and devices for patch panel systems.

BACKGROUND OF THE INVENTION

Local Area Networks and telecommunications connections often use patch panels, especially at the customer's premises to enable cross-connection between telecommunications equipment. Patch panels typically include front and rear connection locations. The rear connections are typically a more permanent type of connection, such as an insulation displacement connector that connects to a copper based, twisted pair telecommunications cable. The front connection locations of the patch panel may include any of a variety of jacks, which allows fairly rapid connection and disconnection between two jacks in the same patch panel, or between one jack in the patch panel and another jack in a nearby patch panel via a patch cord.

In most applications, numerous patch panels are provided to accommodate a significant number of interconnections that must be made. Managing the system requires monitoring the availability and occupancy of the connection locations. In conventional patch panel arrangements, the availability/occupancy of the front connection locations of a patch panel or patch panel system is manually or physically monitored. Such methods of management can be improved; the improvement preferably being effected in a cost efficient and time-saving manner.

SUMMARY OF THE INVENTION

One feature of the present disclosure relates to a method and device that permits a user to upgrade an existing patch panel assembly to a patch panel assembly having monitoring capabilities.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
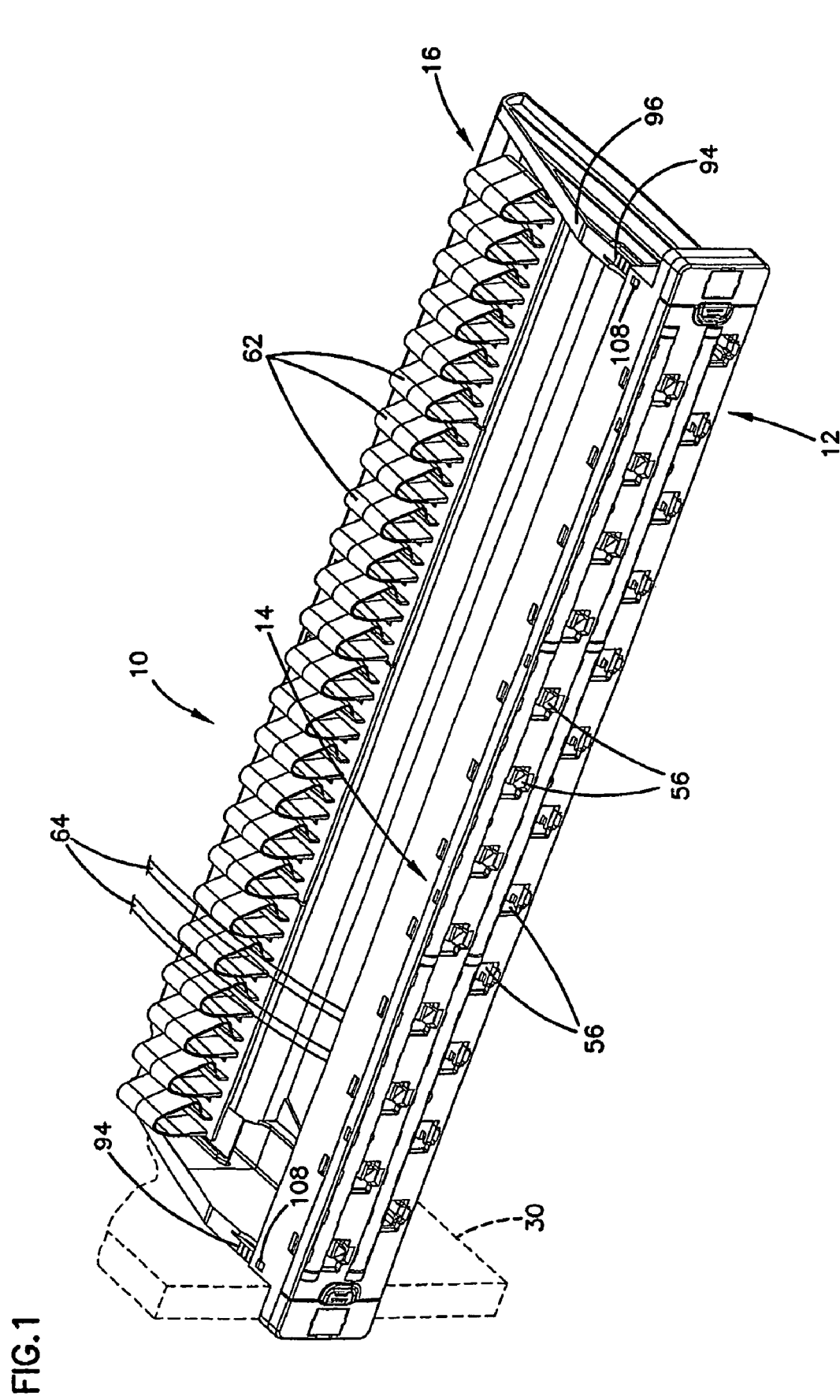
FIG. 1 is a front perspective view of a patch panel assembly, in accordance with the principles disclosed.

FIG. 1 illustrates a patch panel assembly 10 in accordance with the principles disclosed. The assembly 10 includes a cover 12 (e.g., facia or front plate), a panel base or frame 14, and a cable manager 16.

Figure 2:
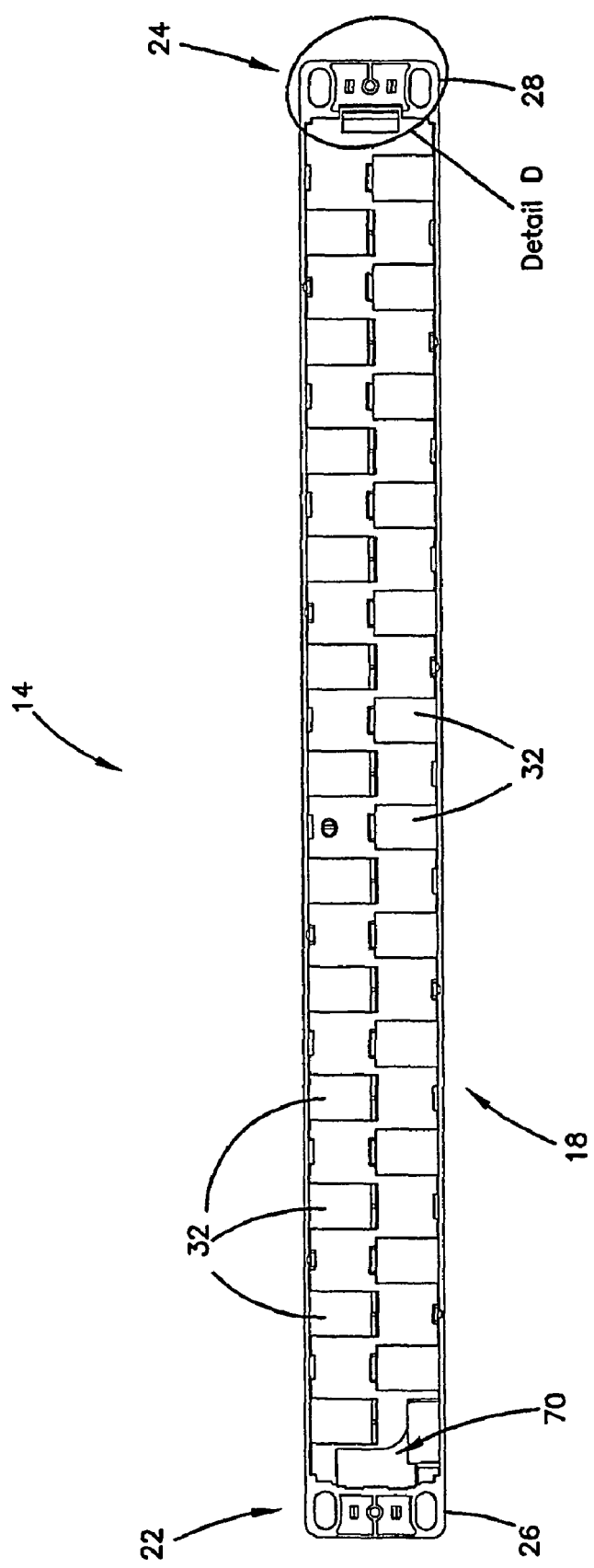
FIG. 2 is a front elevation view of a panel base of the patch panel assembly of FIG. 1.
Figure 3:
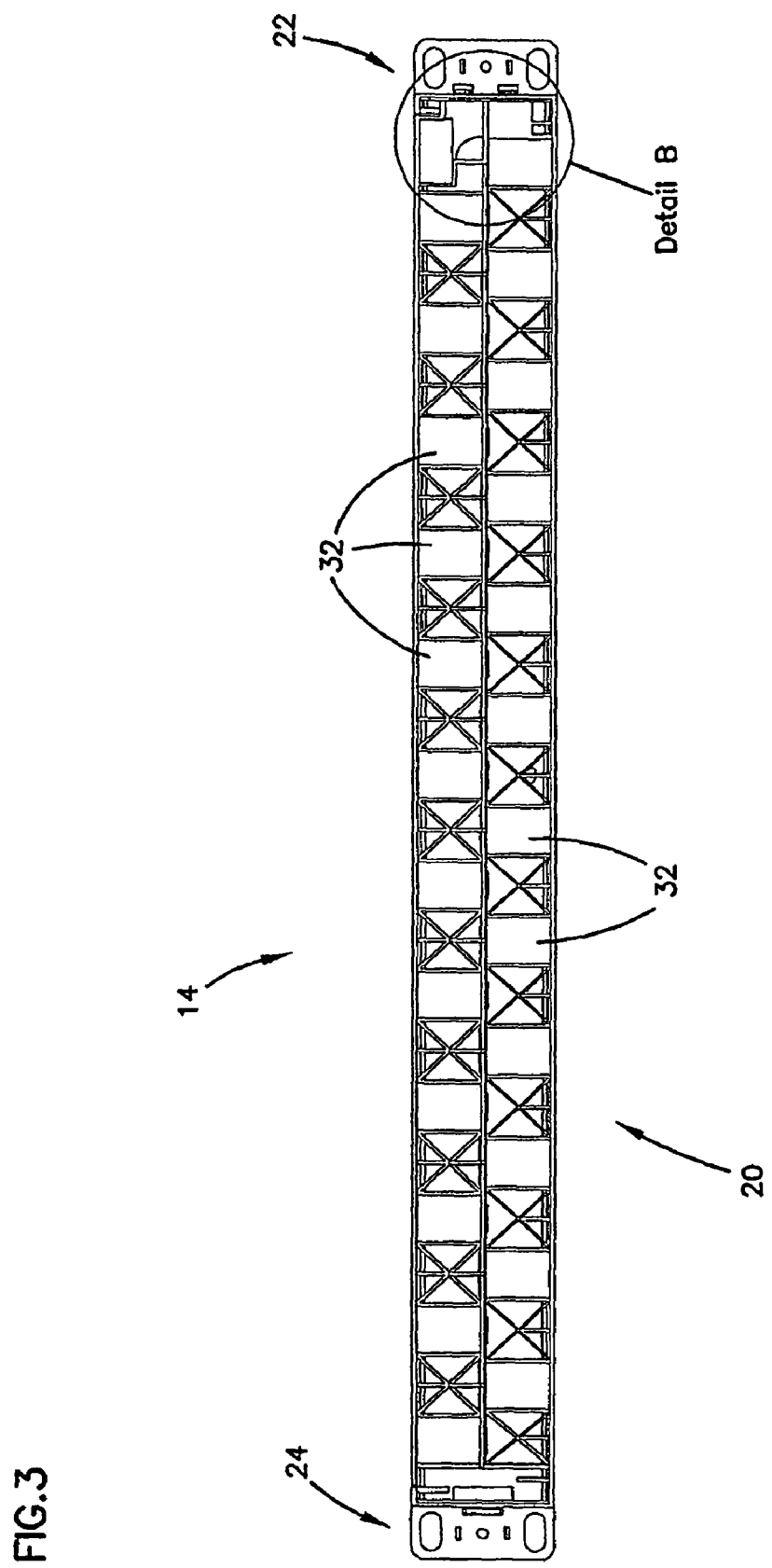
FIG. 3 is a rear elevation view of the panel base of FIG. 2.

Referring to FIGS. 2 and 3, the panel base 14 has a front 18 (FIG. 2), a rear 20 (FIG. 3), and opposing sides 22, 24. Mounting flanges 26, 28 are located at the sides 22, 24 of the panel base. In use, the patch panel assembly 10 is typically mounted by the mounting flanges 26, 28 to a frame or telecommunications structure 30 (shown schematically in FIG. 1), such as a rack, for example. The patch panel assembly can also be mounted to or within other types of structures, such as enclosures or cabinets, for instance.

Figure 4:
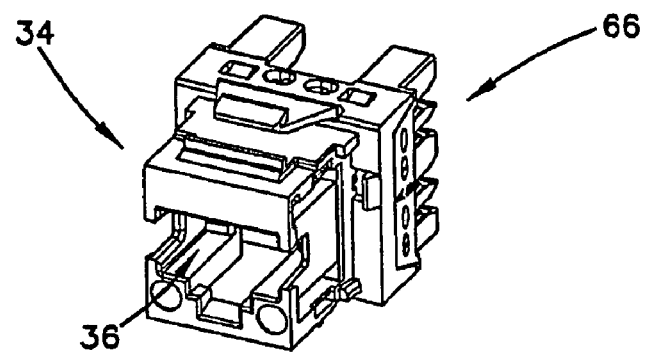
FIG. 4 is a perspective view of a jack of the patch panel assembly of FIG. 1.

Still referring to FIGS. 2 and 3, the panel base 14 defines a plurality of openings 32. The openings 32 are sized to receive jacks 34 (FIG. 4). In the illustrated embodiment, the openings 32 are provided in a staggered arrangement; that is, two rows of spaced apart openings: the spaced apart openings 32 of one row being offset from the spaced apart openings 32 of the other row. The staggered arrangement reduces high-frequency interference between the individual jacks 34 of the assembly.

Figure 5:
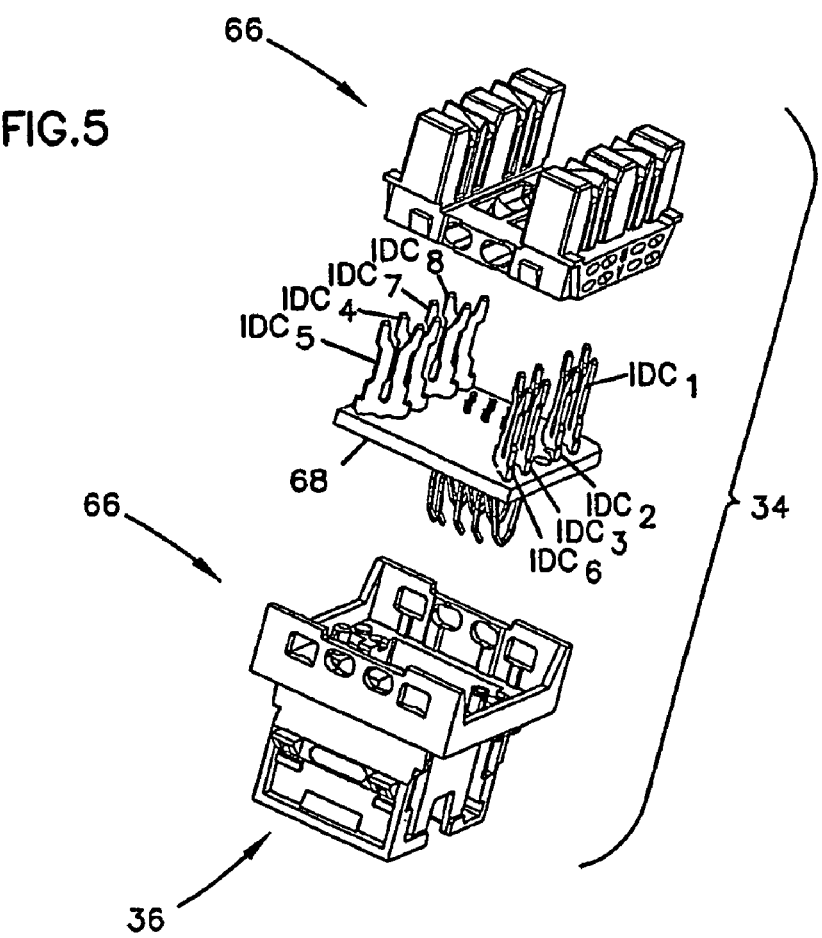
FIG. 5 is an exploded perspective view of the jack of FIG. 4.

The jacks 34 can be RJ style jacks, such as RJ 45 jacks, for example. Other types of jacks can be also be used in accordance with the principles discloses. FIGS. 4 and 5 illustrate the details of one type of RJ 45 jack 34 that is used in the present assembly. In the illustrated embodiment, the jack 34 includes a two-piece dielectric housing 66 and a printed circuit board 68 having insulation displacement contacts ID1-ID8. The housing 66 defines a front port 36. The insulation displacement contacts ID1-ID8 are accessible from the rear of the housing 66 and define rear connection locations 106 (see FIG. 20). Further details of one RJ 45 jack embodiment that can be used in the present patch cord assembly are provided in U.S. application Ser. No. 11/583,995, which application is incorporated herein by reference.

Figure 16:
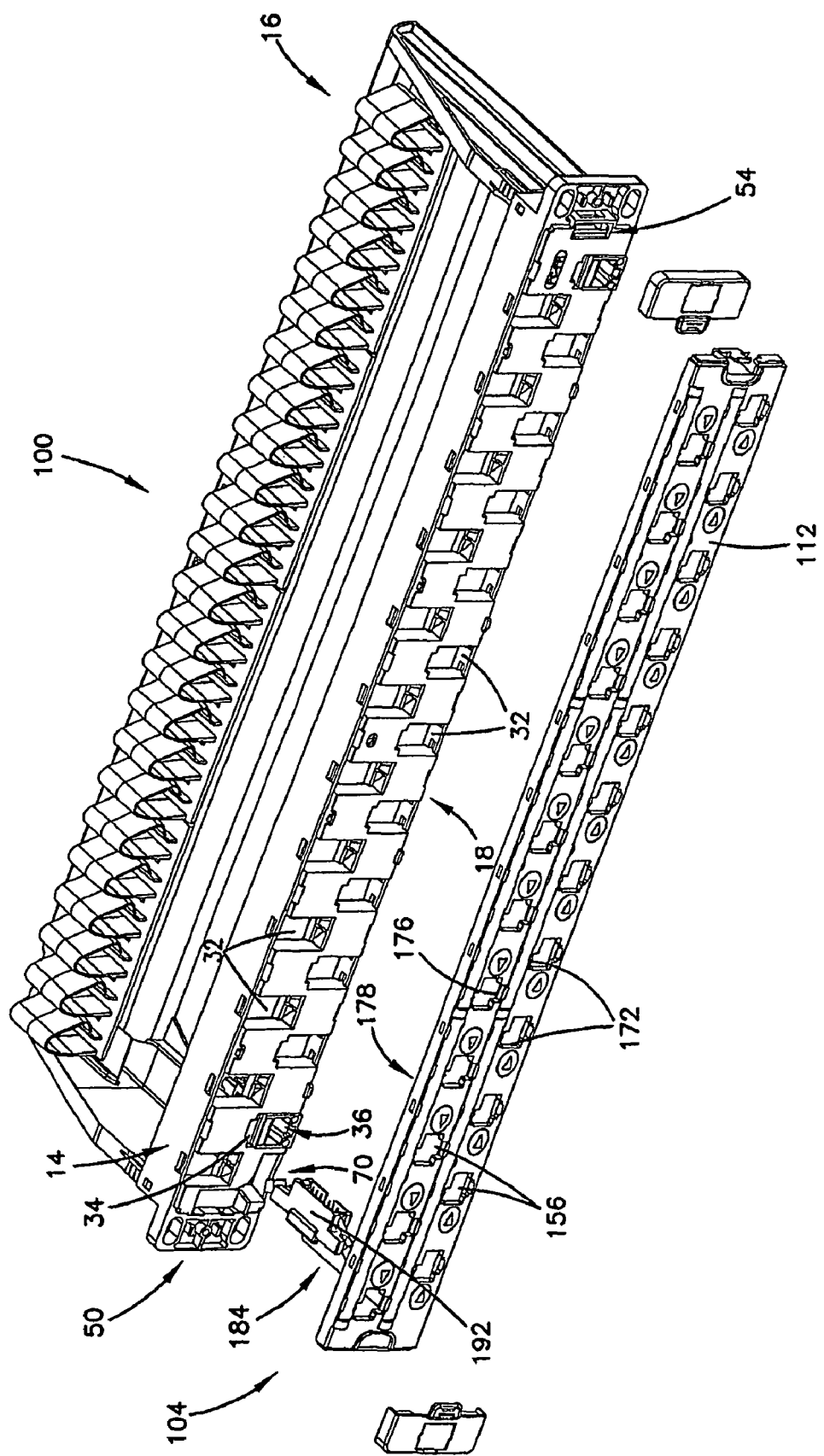
FIG. 16 is a exploded, front perspective view of the upgraded patch panel assembly of FIG. 15.

The jacks 34 of the present patch cord assembly 10 are each positioned within the openings 32 (FIG. 2) of the panel base 14 such that the front port 36 of the jack 34 faces toward the front 18 of the panel base (see FIG. 16, for example). The front port 36 of each jack 34 is sized and configured to receive a jack plug 38 (e.g. a patch cord connector) (FIG. 6).

Figure 6:
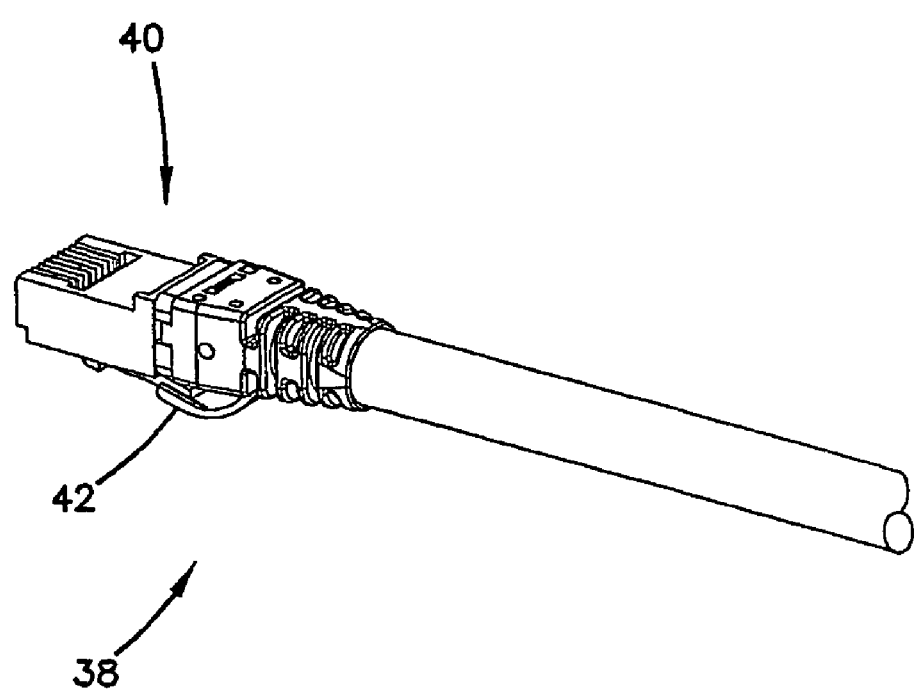
FIG. 6 is a perspective view of a jack plug used with the patch panel assembly of FIG. 1.

Referring to FIG. 6, the jack plug 38 has a first structural plug configuration defined by an insertion end 40 of the plug 38. The plug 38 includes a flexible snap-fit tab 42. The insertion end 40 inserts or plugs into the front port 36 of the jack 34 and detachably secures in place by the snap-fit tab 42.

Figure 7:
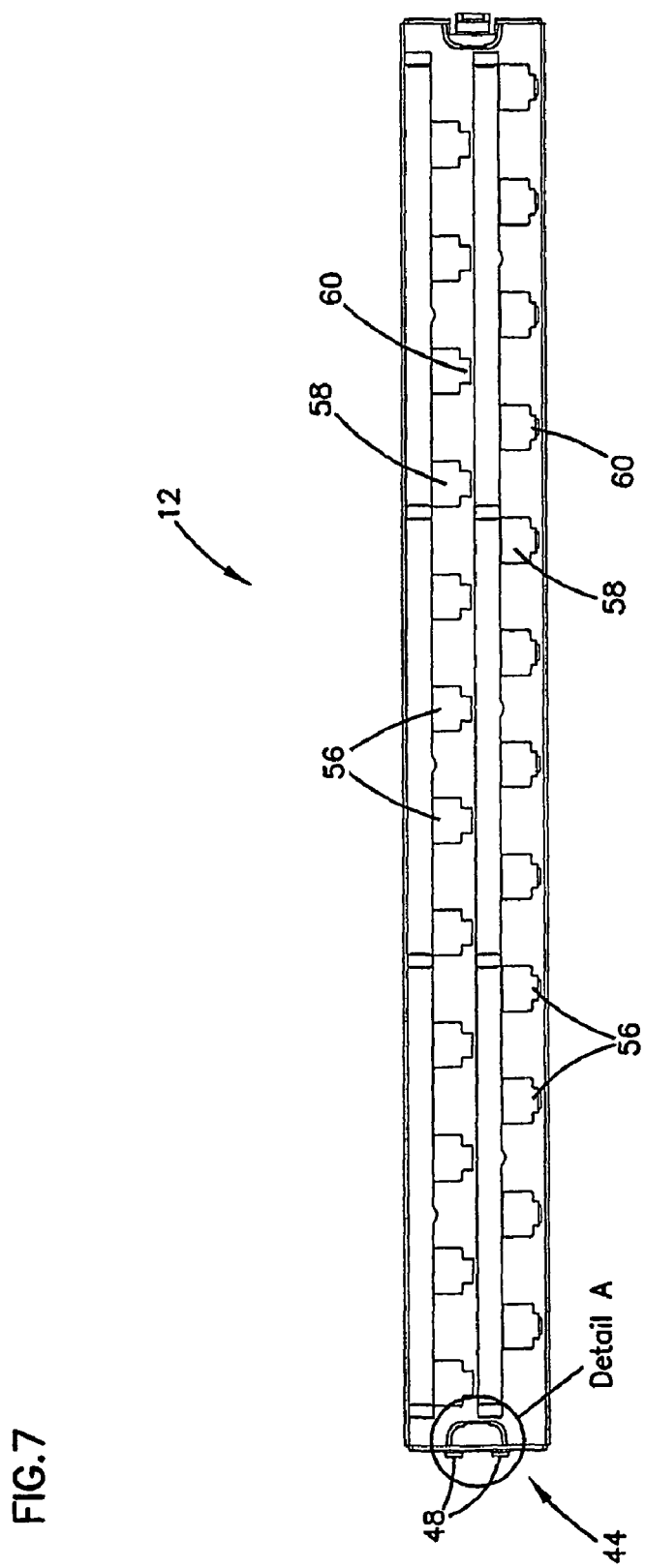
FIG. 7 is a front elevation view of a cover of the patch panel assembly of FIG. 1.
Figure 8:
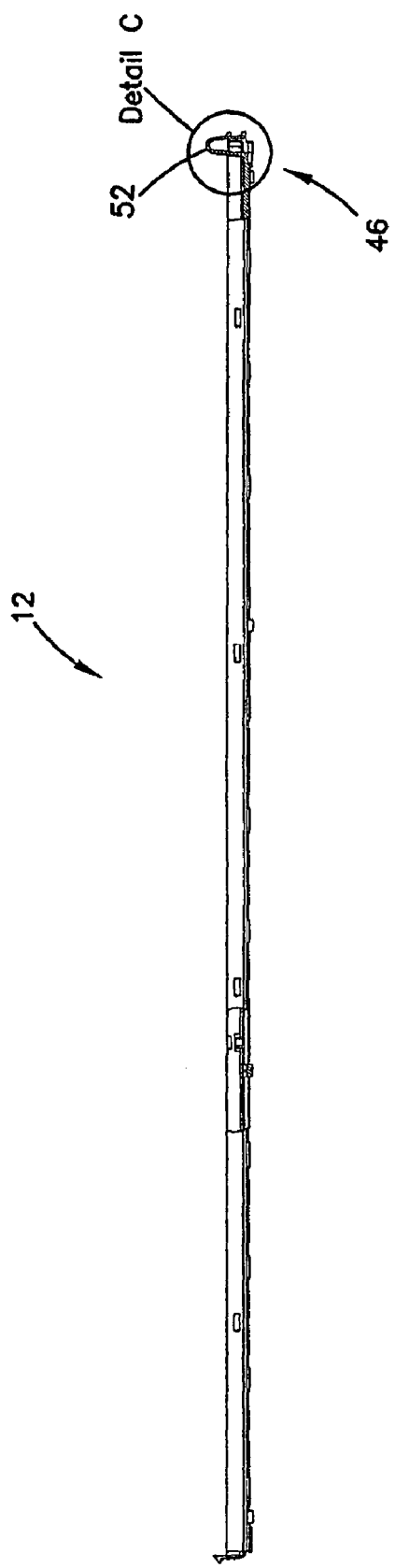
FIG. 8 is a top plan view of the cover of FIG. 7.
Figure 9:
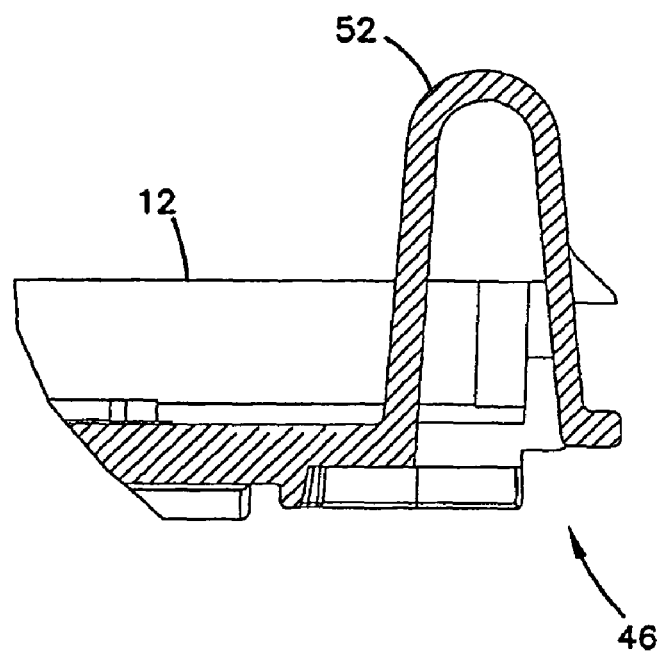
FIG. 9 is an enlarged detail view of a portion of the cover of FIG. 8.
Figure 10:
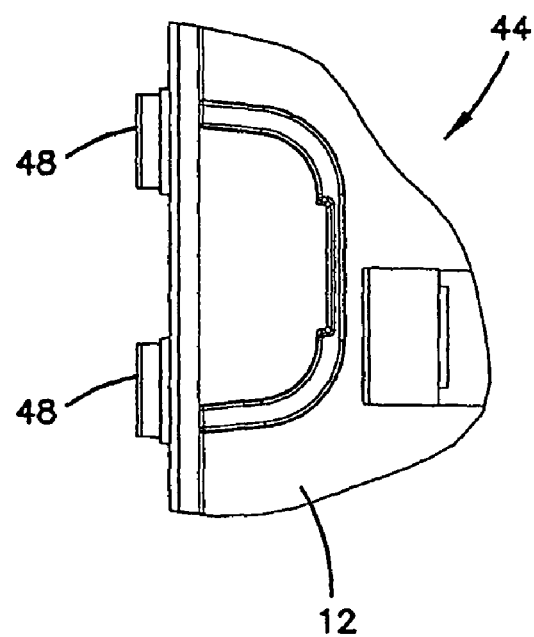
FIG. 10 is an enlarged detail view of another portion of the cover of FIG. 7.

Referring now to FIGS. 1, 7, and 8, the cover 12 of the patch cord assembly 10 is a first removable cover. In one embodiment, the cover 12 is made of plastic. The removable cover 12 secures to the front 18 of the panel base 14 by first and second attachments 44, 46 (FIGS. 9-12). The first attachment 44 includes first and second hooks or catch elements 48 formed on the cover 12 (FIGS. 7 and 10) that engage corresponding hooks or catch elements 50 (FIGS. 3 and 12) formed on the panel base 14. The elements 48, 50 of the first attachment 44 function as a hinge such that the cover 12 hinges at the one side (e.g. 22) of the panel base 14.

Figure 11:
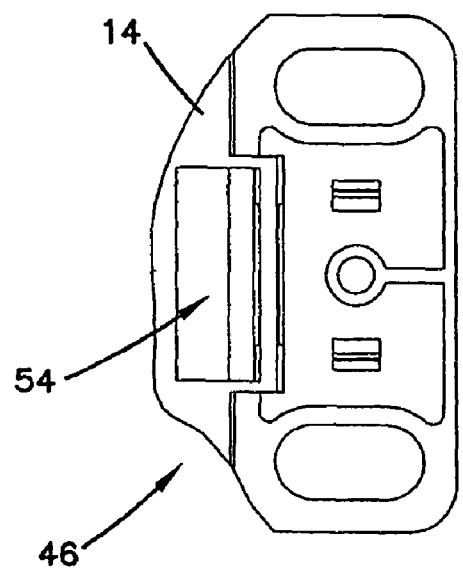
FIG. 11 is an enlarged detail view of a portion of the panel base of FIG. 2.
Figure 12:
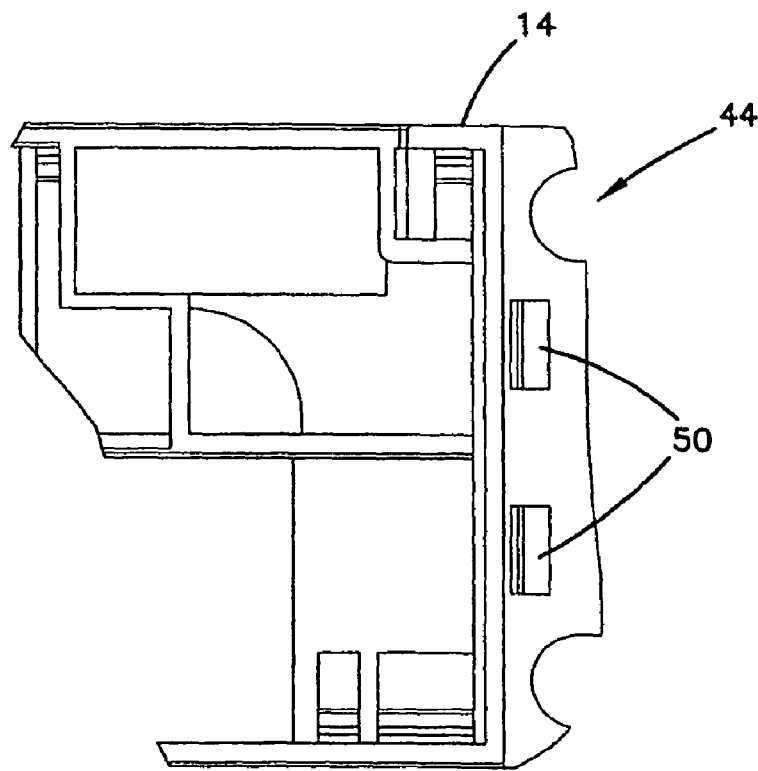
FIG. 12 is an enlarged detail view of another portion of the panel base of FIG. 3.

The second attachment 46 includes a flexible retaining clip or latch 52 (FIGS. 8 and 9) that engages a corresponding aperture 54 (FIGS. 2 and 11). In the illustrated embodiment, the latch 52 (FIG. 8) is provided on the cover 12 while the aperture is formed in the panel base 14 (FIG. 2). In the alternative, the latch may be provided on the panel base and the aperture formed in the cover. The latch 52 snap-fits within the aperture 54 to releasably secure the cover 12 to the front 18 of the panel base 14 when the cover is hinged to a closed position.

Referring back to FIGS. 1 and 7, the cover 12 defines a plurality of jack openings 56. The jack openings 56 provide access to the front ports 36 of the jacks 34 located within the openings 32 of the panel base 14.

As shown in FIG. 7, each of the jack openings 56 defined by the first cover 12 is constructed to receive the plug 38 having the first structural plug configuration. In particular, the openings 56 generally have a larger rectangular upper opening portion 58 and a smaller rectangular lower opening portion 60. This arrangement corresponds to the footprint, or the first structural plug configuration, of the insertion end 40 of the jack plug 38 (FIG. 6).

Figure 13:
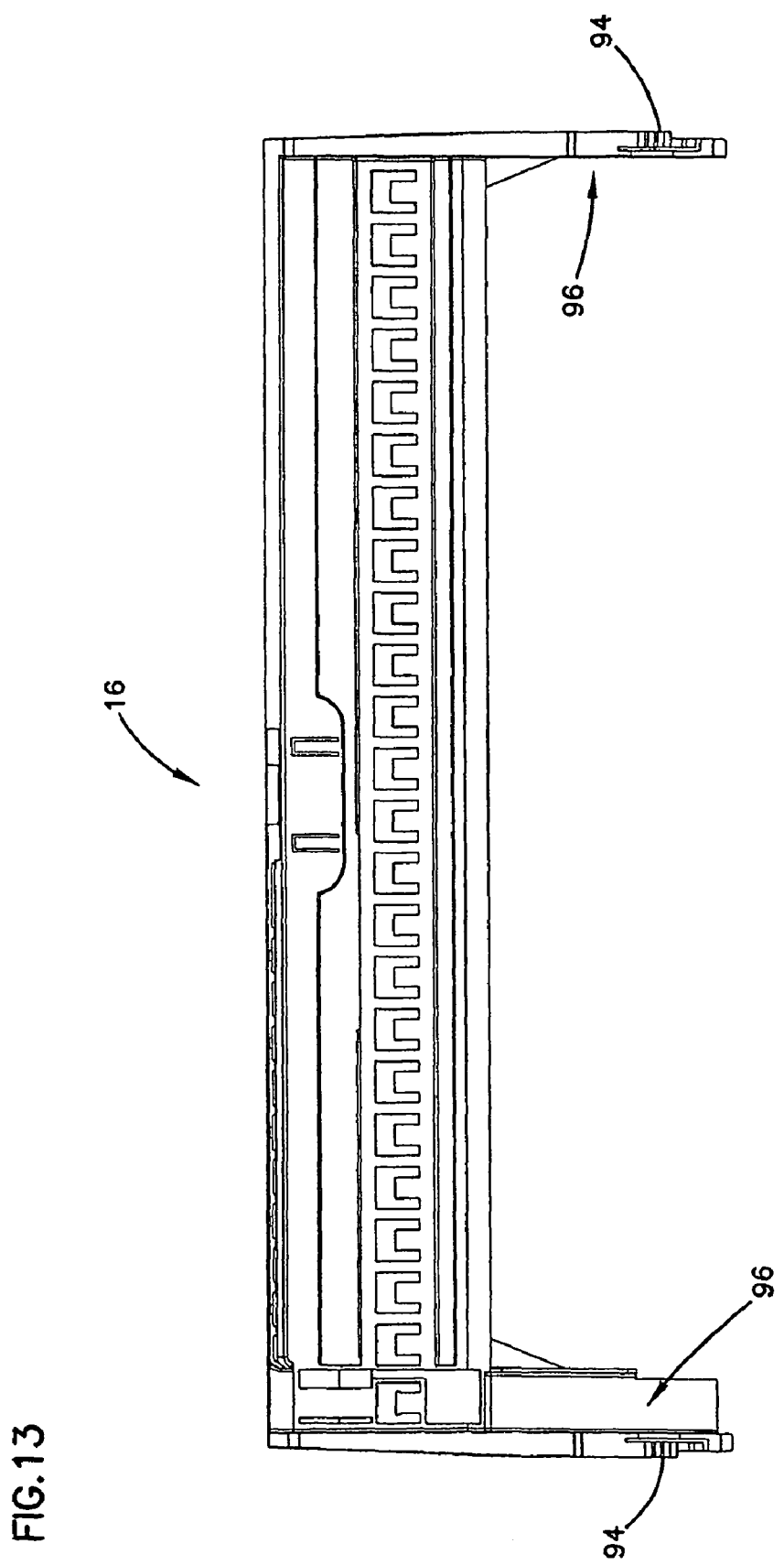
FIG. 13 is a top plan view of a cable manager of the patch panel assembly of FIG. 1.
Figure 14:
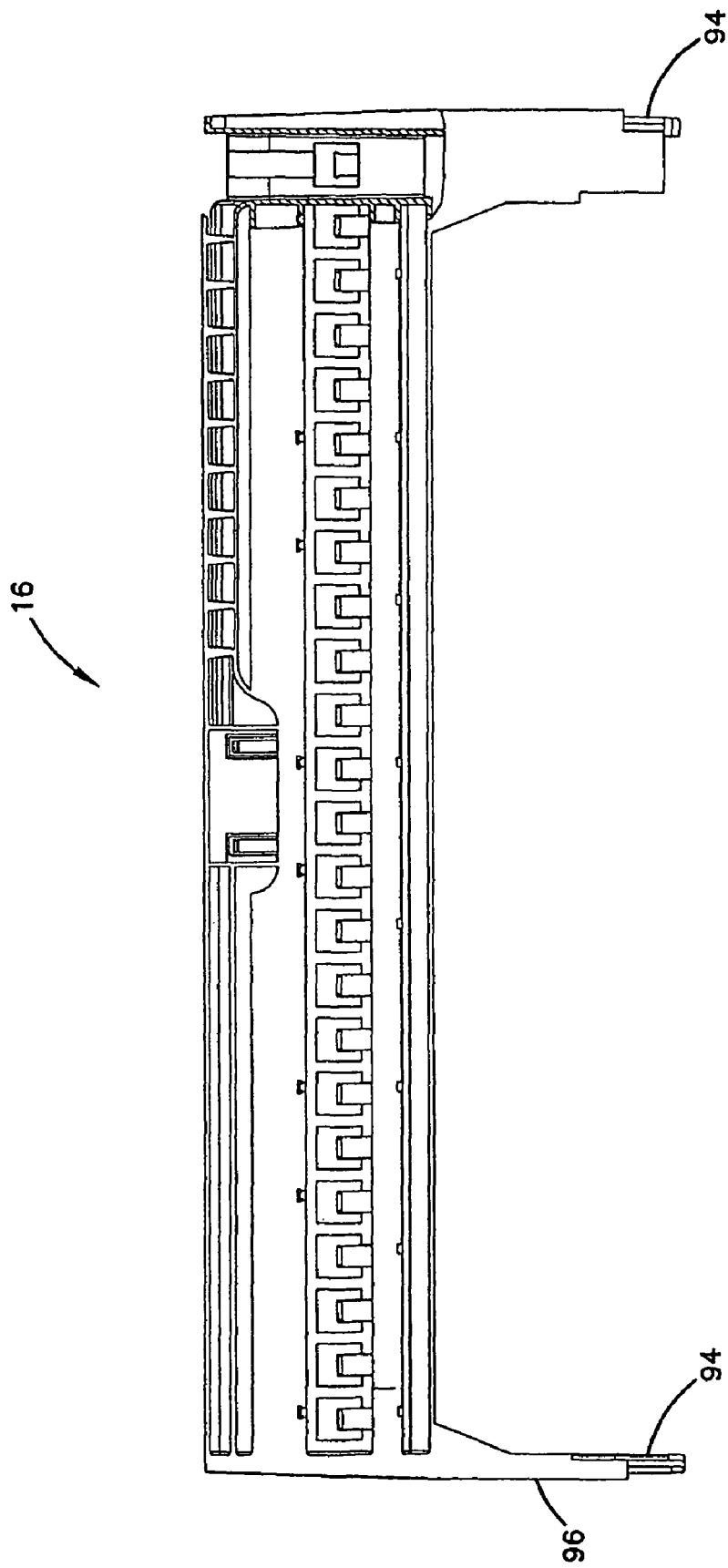
FIG. 14 is a bottom plan view of the cable manager of FIG. 13.

Referring now to FIGS. 1, 13, and 14, the cable manager 16 of the patch panel assembly 10 is attached to the rear 20 of the panel base 14. In particular, latching clips 94 formed on arms 96 of the cable manager 16 engage corresponding structure 108 (FIG. 1) of the panel base 14 to secure the manager 16 to the rear 20 of the panel base 14. The cable manager 16 includes a plurality of guide structures 62 (FIG. 1) that organize cables 64 (shown schematically) interconnected to the jacks 34.

In accordance with the principles of the present disclosure, the patch panel assembly 10 of FIG. 1 is an upgradeable patch panel assembly. In particular, the patch panel assembly 10 is configured to permit a user to upgrade the patch panel assembly with scanner management technology. Referring again to FIG. 2, the panel base 14 includes an upgrade or conversion aperture 70 located adjacent to the staggered rows of openings 32 (see also FIG. 16). The conversion aperture 70 extends through the panel base 14 in a direction from the front 18 to the rear 20. The conversion aperture 70 is sized and configured to receive a scanner interface cable 184 (FIG. 16) when the patch panel assembly is upgraded. In the illustrated embodiment of FIG. 1, the patch panel assembly 10 is not upgraded; accordingly, the conversion aperture 70 is void of any components or elements passing through the aperture, as depicted in FIG. 2.

One feature of the present upgradeable patch panel assembly 10 is that the upgrade can be accomplished without removing or un-mounting the assembly 10 from the frame 30. Moreover, the cables 64 that interconnect to the jacks 34 need not be disconnected from or re-wired to the jacks. The present upgradeable patch panel assembly accordingly saves a significant amount of time and labor in completing a system upgrade, in addition to reducing system down time during the upgrade.

To upgrade the patch panel assembly 10 of FIG. 1, the jack plugs 38 (FIG. 6) having the first structural plug configuration are unplugged from the front ports 36 (FIG. 4) of the jacks 34. The cover 12 is then removed from the front 18 of the panel base 14. The cover 12 can be removed by flexing the latch 52 (FIG. 9) of the second attachment 46 to release the latch 52 from the aperture 54 (FIG. 11) of the panel base 14, and hinging the cover 12 away from the panel base 14 such that the catch elements 48, 50 of the first attachment 44 disengage.

Figure 15:
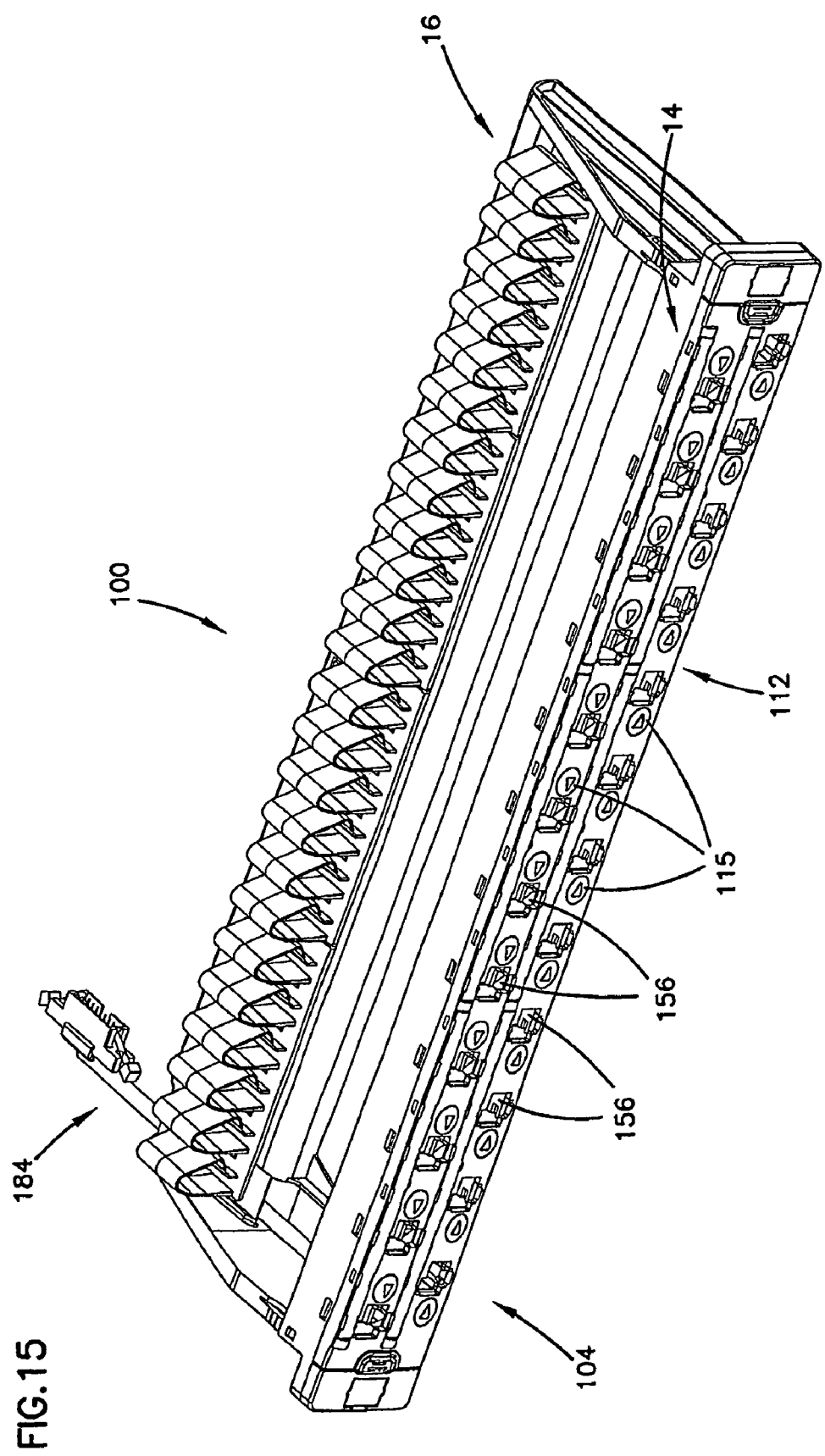
FIG. 15 is a front perspective view of an upgraded patch panel assembly, in accordance with the principles disclosed.

Referring to FIGS. 15 and 16, an upgrade assembly 104 is installed to the existing panel base 14 to provide an upgraded patch panel assembly 100 having monitoring capabilities. The upgrade assembly 104 includes the scanner interface cable 184 and a second upgraded cover 112 that attaches to the front 18 of the panel base 14.

Figure 17:
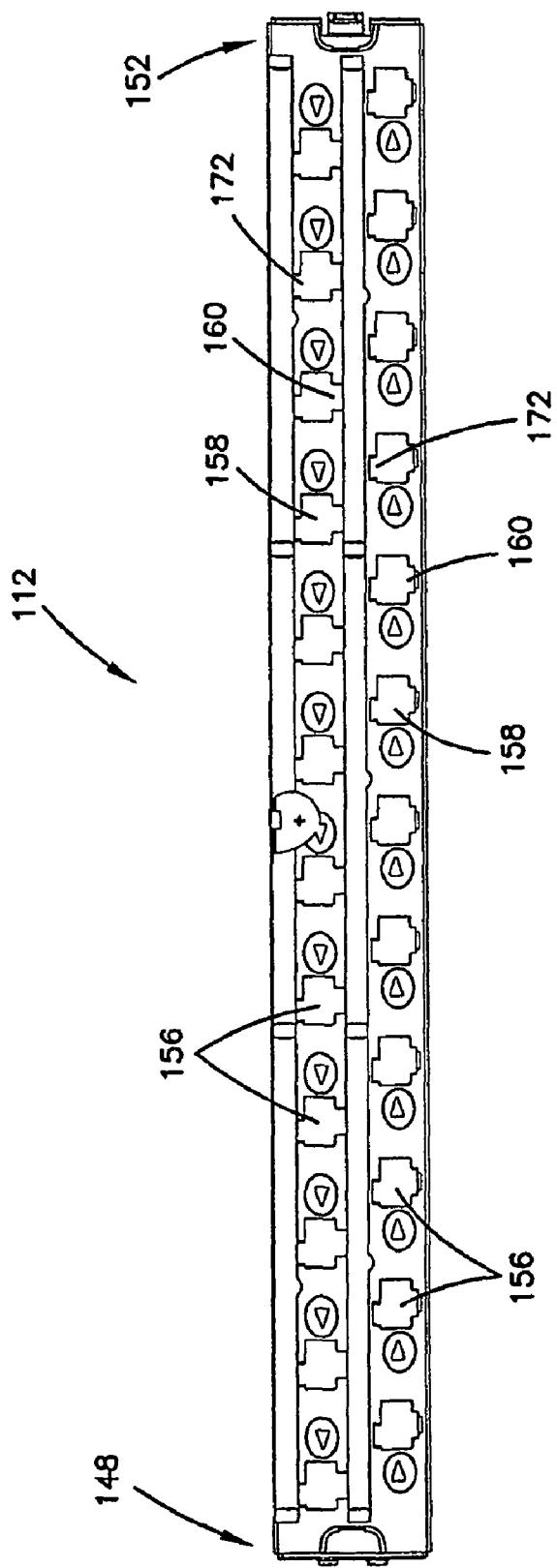
FIG. 17 is a front elevation view of a cover of the upgraded patch panel assembly of FIG. 15.
Figure 18:
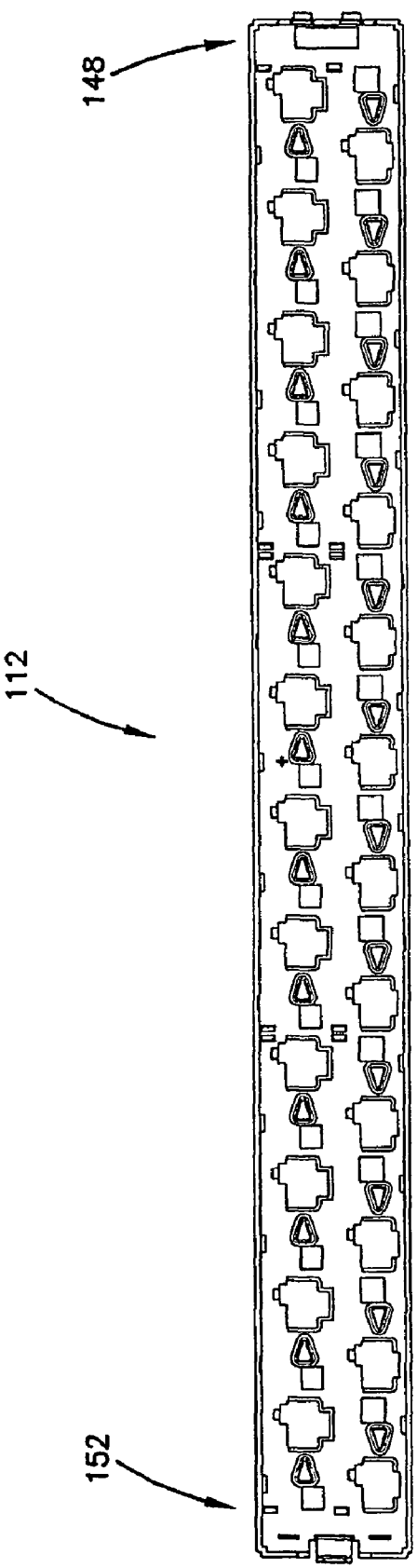
FIG. 18 is a rear elevation view of the cover of FIG. 17.
Figure 19:
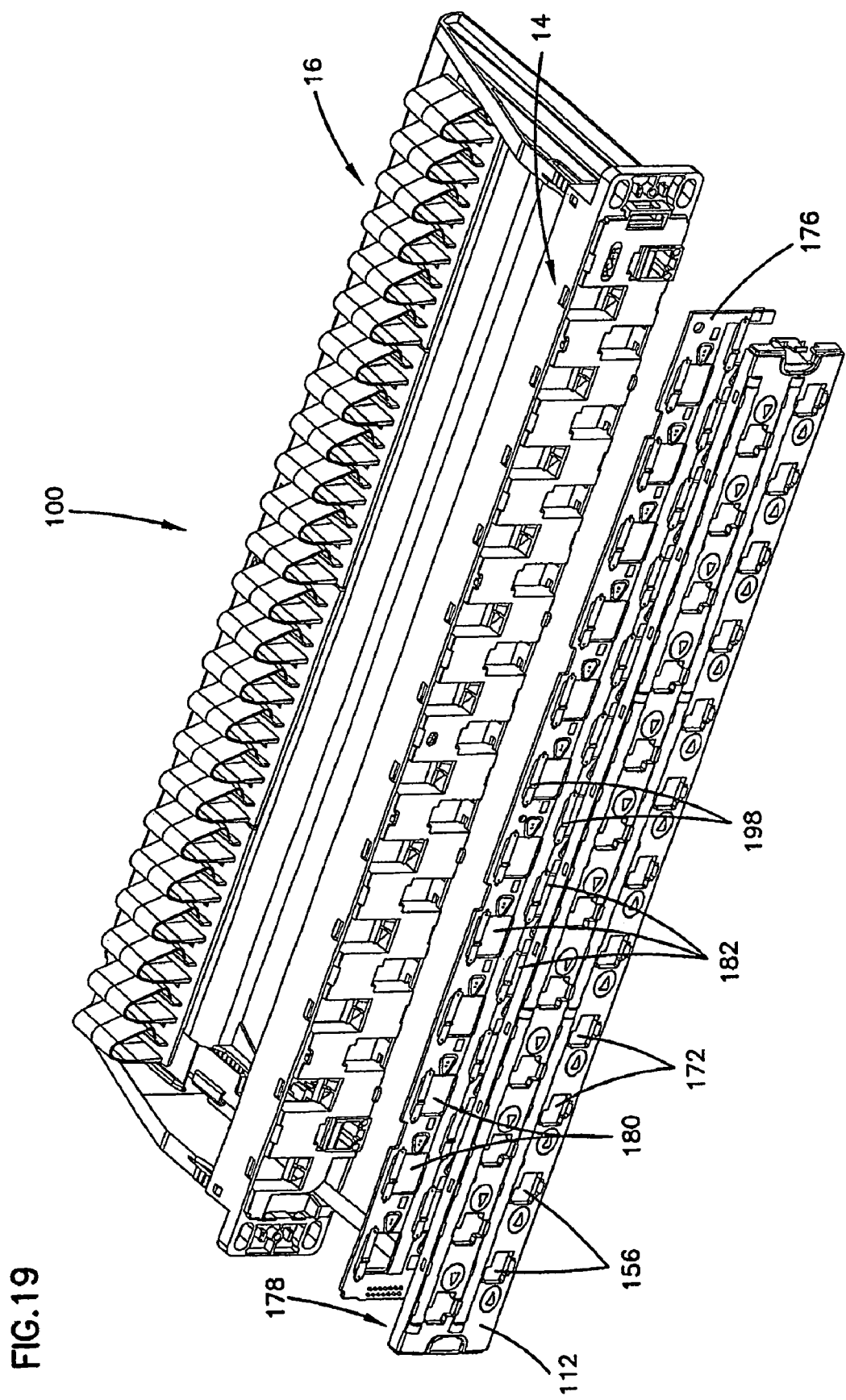
FIG. 19 is a further exploded, front perspective view of the upgraded patch panel assembly of FIG. 16.

The upgraded cover 112 of the assembly 100 is a removable cover secured to the front 18 of the panel base 14 by first and second attachments (e.g., elements 148, 50 and latch 152 and aperture 54; partly shown in FIGS. 17-19). The first and second attachments are the same as those described with respect to the first cover 12. In one embodiment, the upgraded cover 112 is made of plastic. The upgraded cover 112 also defines a plurality of jack openings 156. The jack openings 156 provide access to the front ports 36 of the jacks 34 located within the openings 32 of the panel base 14.

Referring to FIGS. 17 and 18, the jack openings 156 defined by the upgraded cover 112 are constructed to receive upgraded jack plugs 138 (FIG. 21) having a second structural plug configuration that is different from the first structural plug configuration of the first jack plug 38 (FIG. 6). In particular, the openings 156 of the second cover 112 generally have a larger rectangular upper opening portion 158 and a smaller rectangular lower opening portion 160. The openings 156 further define an offset notch 172 extending from the larger rectangular upper opening portion 158 of the opening. The notch 172 is sized to accommodate and receive a contact element 174 (FIG. 21) provided on the upgraded plug 138.

Figure 21:
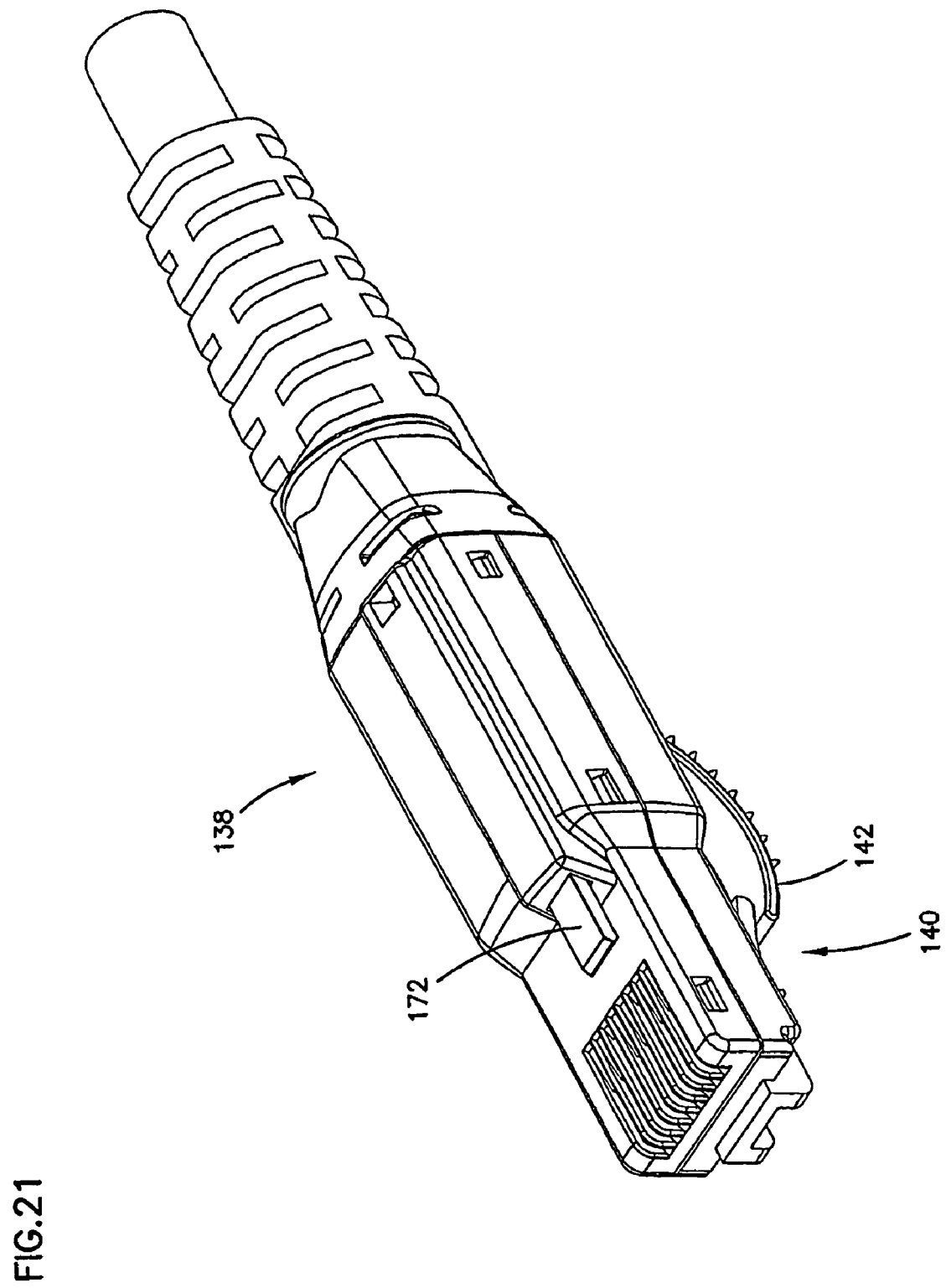
FIG. 21 is a perspective view of a connector used with the upgraded patch panel assembly of FIG. 15.

Referring now to FIG. 21, the contact element 174 of the upgraded jack plug 138 is located at an insertion end 140 of the plug 138. The contact element 174 partly defines the second different structural plug configuration. Similar to the first plug 38, the insertion end 140 of the upgraded plug 138 includes a flexible snap-fit tab 142. The insertion end 140 inserts or plugs into the front port 36 of the jack 34 and detachably secures in place by the snap-fit tab 142. The upgraded jack plugs 138 are configured for use with the same jacks 34 as those to which the first jack plugs interconnect.

Referring now to FIGS. 16 and 19, the upgraded cover 112 of the assembly 100 includes a printed circuit board 176. The printed circuit board 176 is attached to or held against the rear side 178 of the upgraded cover 112 such that the printed circuit board 176 is positioned between the upgraded cover 112 and the panel base 14 when the cover is attached to the panel base 14. The printed circuit board 176 includes a plurality of holes or openings 180. The openings 180 are sized and arranged to permit the jack plugs 138 to pass through the circuit board 176 to engage the jacks 34 secured in the openings 32 of the panel base 14.

The printed circuit board 176 of the upgraded cover 112 includes a plurality of electrical contacts 182. In the illustrated embodiment, the electrical contacts 182 are located such that the electrical contacts 182 are accessible through the offset notches 172 of the openings 156 in the cover 112. As will be described in greater detail hereinafter, the contact elements 174 of the upgraded plugs 138 contact the electrical contacts 182 of the printed circuit board 176 to indicate the presence of the plug 138 in the jack 34.

Figure 20:
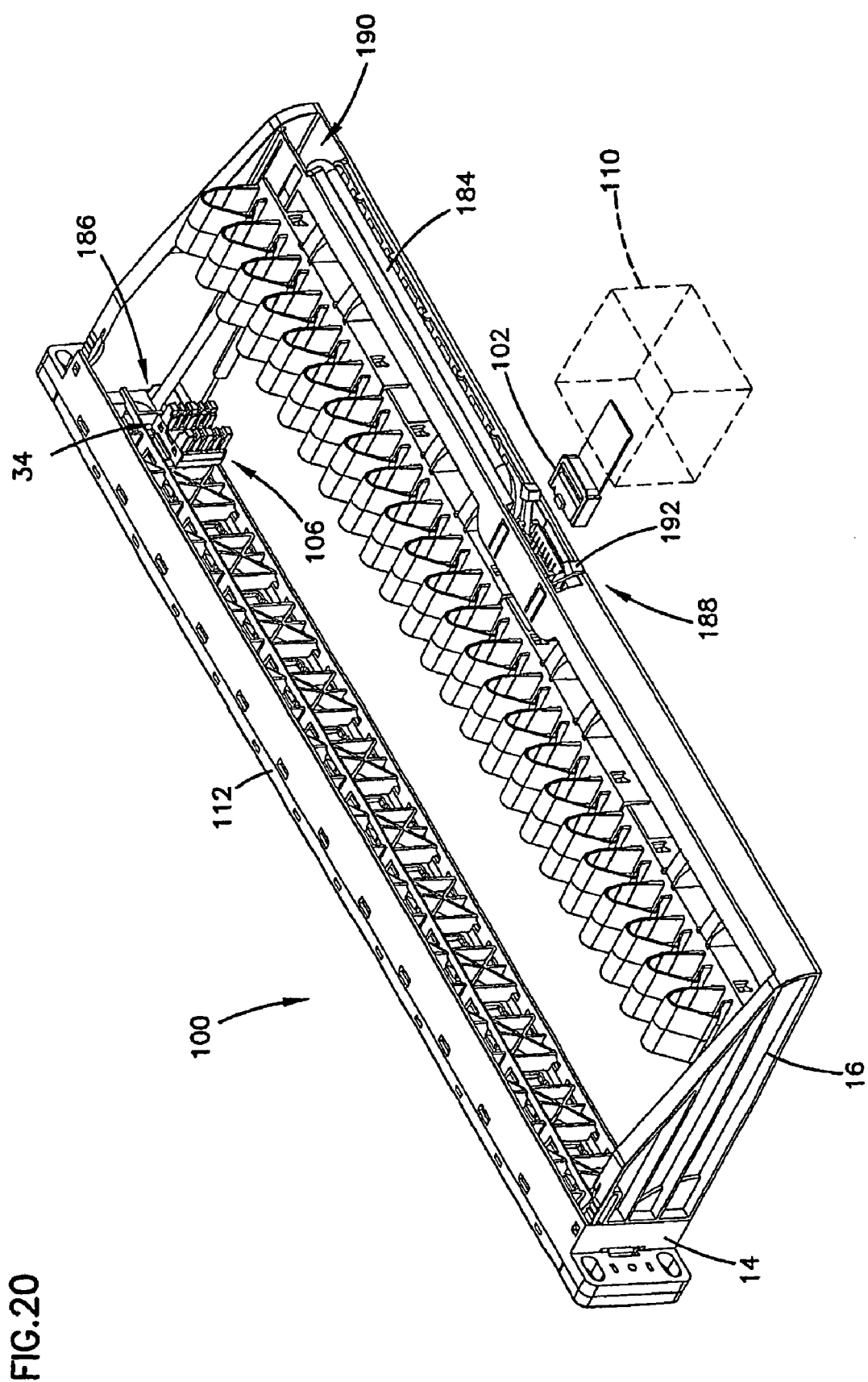
FIG. 20 is a rear perspective view of the upgraded patch panel assembly of FIG. 15.

Referring now to FIGS. 16 and 20, the scanner interface cable 184 has a first end 186 and a second end 188. The first end 186 electrically couples to the printed circuit board 176, either directly or via a first interface connector (not shown). The second end 188 includes a second interface connector 192. When upgrading the patch panel assembly, the second end 188 the interface cable 184 is inserted through the existing conversion aperture 70 of the panel base 14. The existing conversion aperture 70 is accordingly sized to permit the passage of the second interface connector 192. In the illustrated embodiment, the second interface connector 192 of the cable 184 is a ribbon cable connector. The ribbon cable connector 192 interconnects to a scanner lead 102 (FIG. 20), which in turn connects to a scanning device 110 (schematically represented).

As previously described, to upgrade the patch panel assembly 10 of FIG. 1, the plugs 38 are unplugged from the jacks 34 of the assembly and the cover 12 removed. The upgrade assembly 104 is then installed by first positioning the second end 188 of the scanner interface cable 184 through the conversion aperture 70 of the panel base 14. With the interface cable 184 positioned through the existing aperture 70 of the panel base 14, the upgraded cover 112 is attached to the front 18 of the panel base 14, as previously described with respect to the first cover. As shown in FIG. 20, the scanner interface cable 184 can be routed through cable guide structure 190 formed in the cable manager 16 and positioned at the rear of the assembly 100 for interconnection to the scanner device 110.

To complete the upgrade of the assembly, the upgraded jack plugs 138 are inserted within the openings 156 of the cover 112. When the upgraded jack plug 138 engages or snap-fits to the jacks 34, the contact elements 174 (FIG. 21) of the upgraded plug 138 contacts the electrical contacts 182 provided on the printed circuit board 176 (FIG. 19) to establish an electrical connection. In the illustrated embodiment, a detent 198 (FIG. 19) is provided on the electrical contact 182 to ensure such contact or connection.

The upgraded patch panel assembly 100 is now enhanced with scanner management technology provided in part by the connection between the contact 174 of the plug 138 and the electrical contact 182 of the printed circuit board 176.

That is, the occupancy of each individual jack 34 can now be monitored by way of the connection between the element 174 and the electrical contact 182. The scanner interface cable 184 transfers the occupancy information to the scanner device 110. This information is useful to a user in managing system connections availability. In particular, a user can collect and monitor occupancy/availability information of the patch panel connections without having to manually or physically inspect how many jack ports are in use.

In the illustrated embodiment, the upgraded patch panel assembly 100 includes light emitting diodes 115 (FIG. 15) that illuminate to indicate that a particular patch panel port or jack is occupied. In instances where visual inspection of the patch panel assembly 100 is necessary, the illuminated diodes aids in directing the user's attention to the occupied jack ports.

The patch panel assembly of FIG. 1 offers the adaptability to upgrade to scanner management technology while minimizing the impact of the upgrade. That is, the present upgradeable patch panel assembly 10 can be upgraded without removing or un-mounting the assembly 10 from the frame, and does not require rear cable disconnection or re-wiring. The present upgradeable patch panel assembly accordingly minimizing the impact of an upgrade by reducing the time and labor needed to complete the upgrade, and by reducing system down time during the upgrade.

The above specification provides a complete description of the present invention. Since many embodiments of the invention can be made without departing from the spirit and scope of the invention, certain aspects of the invention reside in the claims hereinafter appended.

What is claimed is:

1. A telecommunication system, comprising:
   a) a telecommunications patch panel, including:
      i) a panel body having a front and a rear;
      ii) a plurality of jacks mounted to the panel body;
      iii) a cover attached to the front of the panel body, the cover defining jack openings that provide access to the jacks; and
      iv) a printed circuit board positioned at a rearward side of the cover, the cover including contacts that indicate receipt of a plug within an associated one of the jack openings;
   b) an interface cable routed through the telecommunications patch panel, the interface cable having a first end and a second end, the first end being coupled to the printed circuit board at the front of the panel body, the second end being located at the rear of the panel body, the interface cable providing jack-occupancy monitoring capabilities; and
   c) a cable manager located adjacent to the rear of the panel body.

2. The telecommunication system of claim 1, wherein the first end of the interface cable is routed through a conversion aperture formed in the panel body of the telecommunications patch panel.

3. The telecommunication system of claim 1, wherein the first end of the interface cable includes an interface connector that couples to the printed circuit board.

4. The telecommunication system of claim 1, wherein the cover includes indicators that visually indicate receipt of a plug within an associated one of the jack openings.

5. The telecommunication system of claim 1, wherein the jack openings include a notch sized to receive a contact element of a jack plug.

6. The telecommunication system of claim 5, further including jack plugs that are inserted into the jack openings of the cover and that engage the jacks mounted to the panel body, each of the jack plugs having a contact element.

7. The telecommunication system of claim 6, wherein an electrical connection is established between the contact element of the jack plugs and the printed circuit board when the jack plugs are inserted into the jack openings of the cover.

8. The telecommunication system of claim 7, wherein the printed circuit board includes contact elements, the contact elements of the printed circuit board being accessible through the notch of the jack openings.

9. The telecommunication system of claim 6, wherein the printed circuit board defines a plurality of holes, the holes being arranged to permit the jack plugs to pass through the printed circuit board to engage the jacks mounted to the panel body.

10. The telecommunication system of claim 1, wherein the cover includes a latch that attaches the cover to the front of the panel body.

11. The telecommunication system of claim 1, further including a scanning device having a scanner lead, the second end of the interface cable being connected to the scanner lead of the scanning device.

\* \* \* \* \*